United States Patent [19]

Moriya

[11] Patent Number: 4,851,927

[45] Date of Patent: Jul. 25, 1989

[54] DIGITAL COLOR PRINTER

[75] Inventor: Shigeru Moriya, Osaka, Japan

[73] Assignee: Minolta Camera Kabushiki Kaisha, Osaka, Japan

[21] Appl. No.: 193,363

[22] Filed: May 12, 1988

[30] Foreign Application Priority Data

May 14, 1987 [JP] Japan ............................... 62-119516

[51] Int. Cl.$^4$ ...................... H04N 1/29; G03G 15/01
[52] U.S. Cl. ..................................... 358/300; 346/157
[58] Field of Search ........................... 358/300, 78, 75; 346/157

[56] References Cited

FOREIGN PATENT DOCUMENTS 61-123257  6/1986  Japan .

Primary Examiner—C. L. Albritton
Assistant Examiner—Scott A. Rogers
Attorney, Agent, or Firm—Price, Gess & Ubell

[57] ABSTRACT

This invention relates to a digital color printer which executes printing of plural colors with electrophotographic means for certain rounds corresponding to the number of printable colors. The digital color printer of the present invention has a buffer memory wherein image signals scanned by image sensor are written, and wherefrom image signals are sequentially read in the written order. Due to ring-shaped constitution of buffer memory, the digital color printer precisely prints color image without causing color deviation by means of controlling timings for starting the image writing and reading operations.

8 Claims, 5 Drawing Sheets

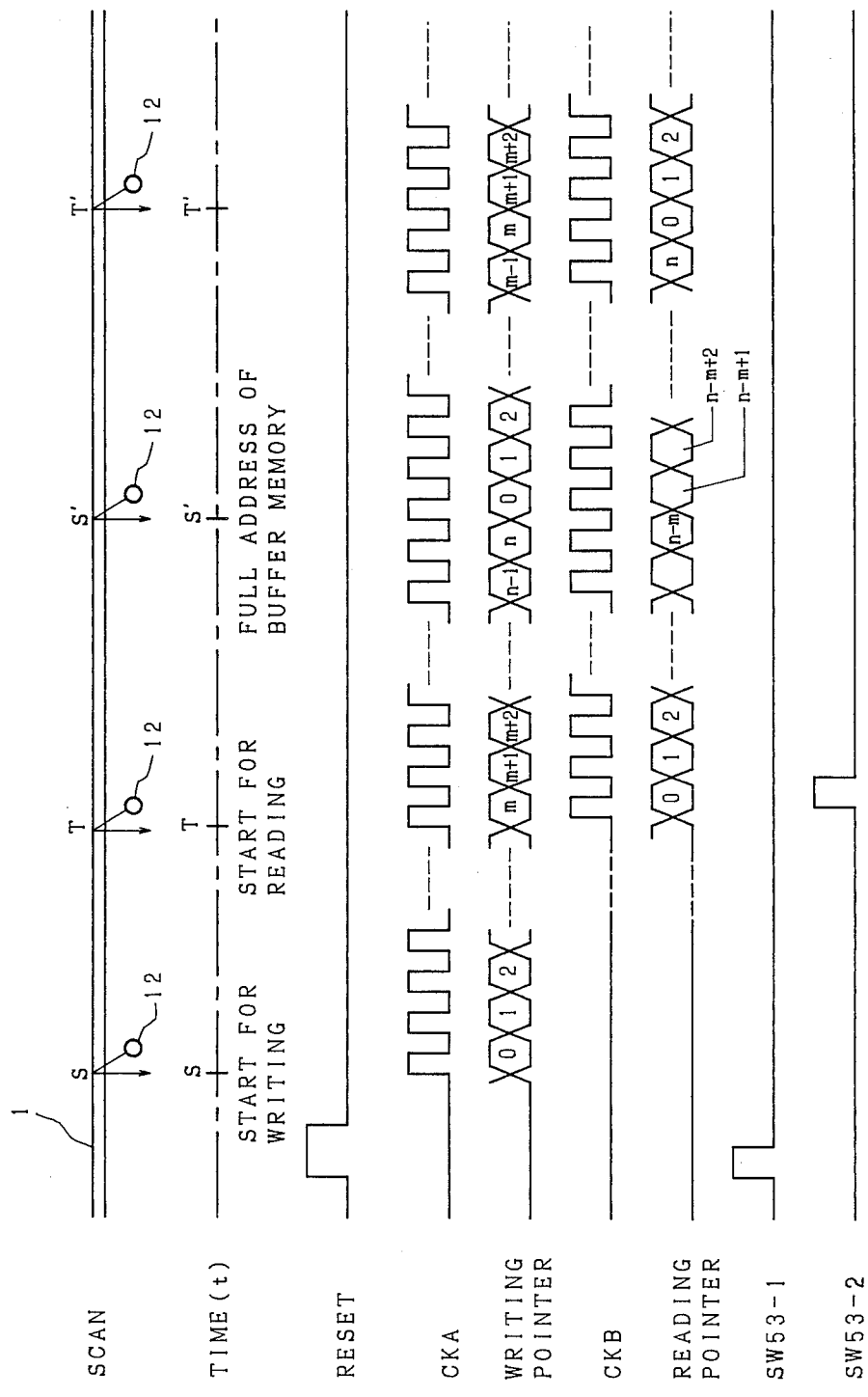

DIGITAL COLOR PRINTER

BACKGROUND OF THE INVENTION

1. Field of the Invention

The present invention relates to a digital color printer.

2. Description of the Prior Art

Conventionally, any digital color printer consists of image reading means and printing means. Using an image sensor like a charge coupled device (CCD), an image reading means reads the image of the original document and it converts the readout image into the digital values which can be subsequently converted into pring output colors which are yellow, magenta, cyan, and black. Printing means prints an image corresponding to those print output signals on a printing paper via an electrophotographic process. When printing full colors, the identical printing paper is repeatedly fed back to the printing process in order that an image for each color is printed on the identical printing paper in full shades.

In any conventional full-color printer, if the printer uses a buffer memory having an insufficient storage capacity instead of a large-capacity image memory which corresponds to the size of an original document than, in order to prevent the printing position from any deviation, the image reading operation must be executed synchronous with the printing operation. To achieve this mode of operation, an extremely fine accuracy is essential for exactly matching the printing position.

Assuming that the scanner, including light source 12 reads the top edge of the original document (see FIG. 2) at the moment when reference point A (like the top edge of the printing paper for example) of image-transfer drum 51 is at position B as shown in FIG. 1, where the image-transfer drum 51 transfers toner image onto the printing paper being wound on it, then an initial scanning and printing of the first color are executed subsequent to the scanning operation of the scanner and the rotation of image-transfer drum 51. Subsequently, the second scanning operation and the printing of the second color are executed. In FIGS. 1 and 2, if the scanner including light source 12 were in a condition to read point Q which is different from the top edge P of the original document when reference point A is at position B, the distance between P and Q is printed in the form of deviated color. This is because the scanner repeats the reciprocating movements, and thus, the shifting speed of the scanner right after starting the image-reading operation is unstable while the continuous rotation speed of the image-transfer drum 51 is stabilized. The compensate for this, any conventional digital color printer tries to constrain color deviation by precisely adjusting the rise characteristic of the scanner driving motor.

According to a prior art, device proposed by Japanese Patent Application Laid-Open No. 61-123257 (1986), the color image processing system is provided an image-reading operation which is preliminarily executed by delaying the image formation so that the buffer memory can absorb the difference. In other words, data of the first line of the original document is written into the buffer memory before the reading image. This prior art allows the start of the data reading from the first line and subsequently activation of the data writing operation. Nevertheless. since the data writing and reading operations are executed for each line, an address line must strictly be controlled. So a difficulty exists in that this requires complex control circuits.

SUMMARY OF THE INVENTION

The primary object of the present invention is to provide a digital color printer which precisely executes color image printing operations without causing color deviation by applying a simplified control circuit.

To achieve this, the digital color printer related to the invention has a buffer memory, wherein image data is written and, wherefrom image data is read independently, means for instructing a start of the scanning operation of the image-reading means, means for instructing a start of image data writing into a buffer memory, and means for starting an image data reading from a buffer memory only after generating an instruction for activating the data writing operation.

The above and further objects and features of the invention will more fully be apparent from the following detailed description with accompanying drawings.

BRIEF DESCRIPTION OF THE DRAWINGS

FIG. 6 is an timing chart of a digital color printer related to the invention.

DESCRIPTION OF THE PREFERRED EMBODIMENT

Figure 1:
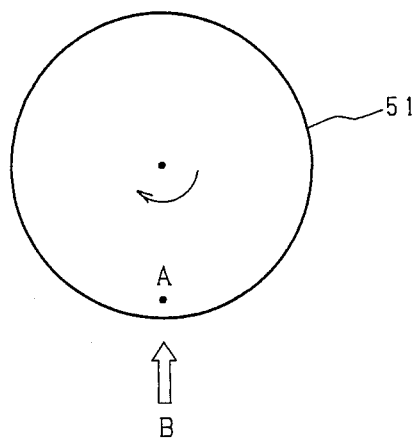
FIGS. 1 and 2 are charts, showing the occurrence of color deviation respectively.
Figure 2:
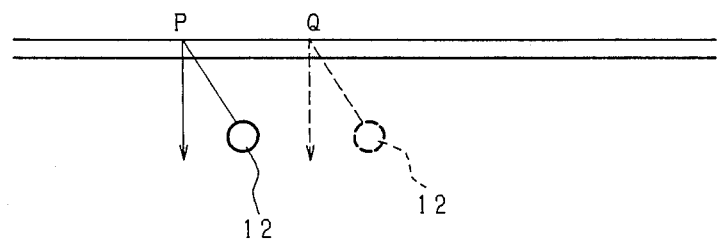
Figure 3:
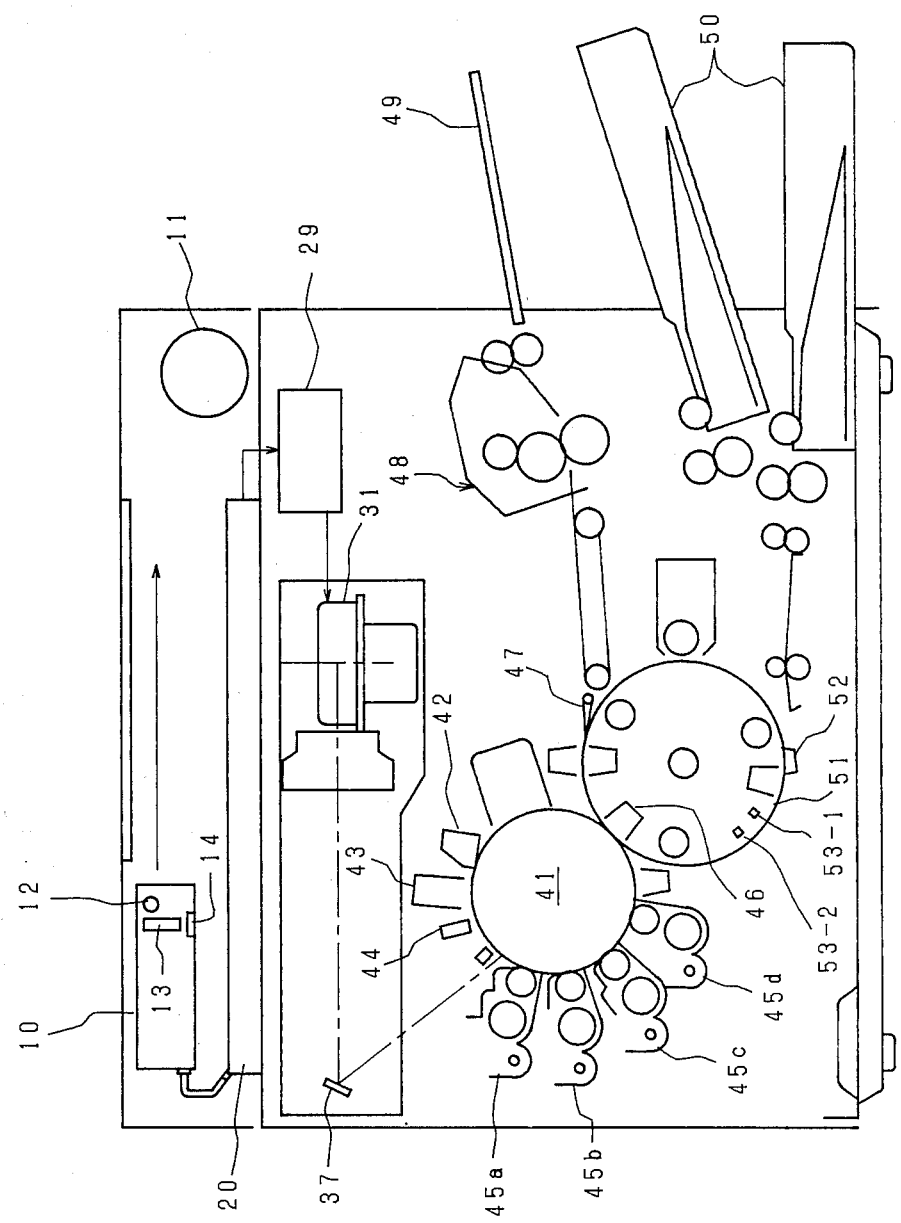
FIG. 3 is a schematic diagram of a preferred embodiment of a digital color printer related to the invention.
Figure 4:
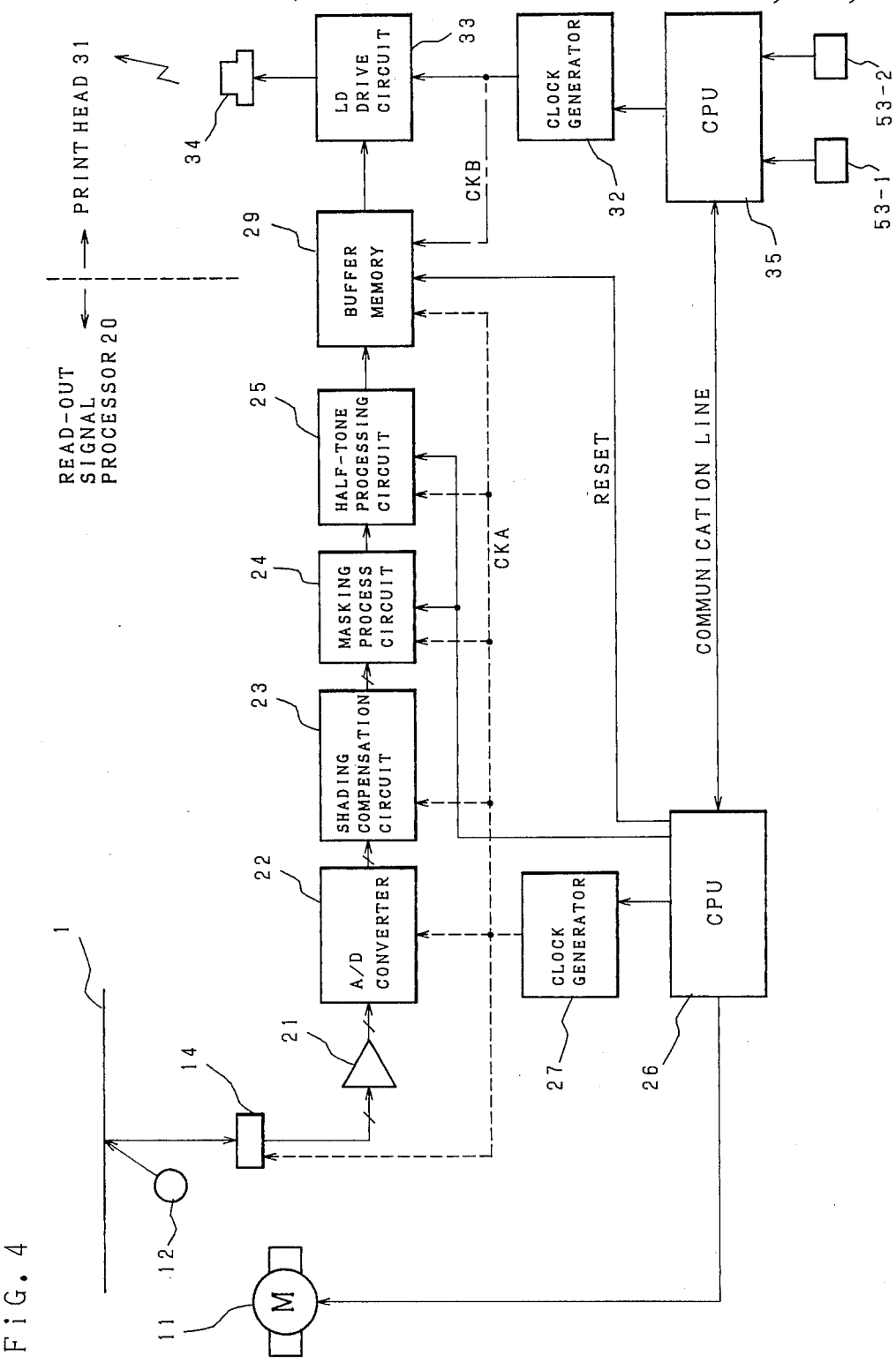
FIG. 4 is a simplified block diagram of the electrical circuit of a digital color printer related to the invention.

FIG. 3 is an overall schematic diagram of a preferred embodiment of a digital color printer related to the invention. Scanner 10 is provided with exposure lamp 12 which illuminates the original document, rod-lens array 13 condenses light reflected from the original document, and image sensor 14 which consists of a CCD color sensor for converting the condensed light into electrical signals. When the image-reading operation is entered, scanner 10 scans the original document 1 (see FIG. 4) placed on the platen by driving force from motor 11 (see FIG. 4). Image sensor 14 executes photoelectric conversion of image on the surface of the original document illuminated by light source 12. Electrical signals generated by image sensor 14 are converted into print output signals composed of yellow, magenta, cyan, and black, by read-out signal processor 20. That is, as shown in FIG. 4, the photoelectrically-converted image signal is converted into an image density signal by a log amplifier 21 and converted into digital values by A/D converter 22. Digitally-converted image signals are transmitted to shading-compensation circuit 23 for shading compensation. Red, green, and blue colors are processed in parallel by those signal processing circuits mentioned above. Next, by the inputted three color signals, masking process circuit 24 generates print color signals composed of either yellow, or magenta, or cyan, or black, in accordance with toner characteristic. A control signal from CPU 26 determines which color signal should be generated. Half-tone processing circuit 25 converts signals from a masking process circuit 24 into binary-encoded false half-tone signals.

Then, binary-encoded image signals, (print output signals) are written into a buffer memory 23 having a ring-shaped constitution. Those signal processing operations mentioned above are executed in the read-out signal processor 20, where image signals are processed synchronous with a clock CKA generated by clock-generator 27.

Print head 31 reads data from buffer memory 29 synchronous with clock CKB which is generated by the other clock generating circuit 32. In response to the data read by the print head 31, LD drive circuit 33 blinks semiconductor laser LD 34.

Prior to the start of the scanning operation, CPUs 26 and 35 communicate so that clocks CKA and CKB have an identical frequency respectively. CPU 26 controls image reading means which is composed of scanner 10 and read-out signal processor 20, and so forth, whereas CPU 35 controls printing means which is composed of print head 31, photosensitive drum 41, and image-transfer drum 51, and so forth. These CPUs 26 and 35 respectively designate the number of clocks for the clock-generating circuits 27 and 32. The number of clocks is specified with the size of the original document or printing paper. CPU 26 resets buffer memory 29.

As shown in FIG. 3, laser means generated by semiconductor laser 34 is directed to photosensitive drum 41 via reflection mirror 37. By this, image is generated on photosensitive elements of this photosensitive drum 41.

Whenever each printing cycle is entered, the photosensitive drum 41 receives light from main eraser lamp 42 and sub-eraser lamp 44 before exposing itself to light from semiconductor laser 34, and in addition, the photosensitive drum 41 is charged by corona discharger 43. When photosensitive drum 41 receives light, an electrostatic latent image is generated on the surface of this drum 41. Then, only one of the toner developers 45a through 45d dealing with yellow, magenta, cyan, and black, is selected for developing electrostatic latent image on photosensitive drum 41. Imagetransfer corona discharger 46 transfers the developed image to the printing paper which is wound on an image-transfer drum 51.

These processes mentioned above are repeatedly executed for dealing with at least more than two colors which can be yellow, magenta, cyan, and black. While those processes are underway, scanner 10 repeats the scanning operations in moderate synchronism with the rotations of photosensitive drum 41 and image-transfer drum 51. Printing papers are delivered from paper cassettes 50, 50, while the top edge of the printing paper is caught by a chucking device 52 on an image-transfer drum 51 and receive transmissions of all the designated colors. After completing the transfer of all the designated colors onto the printing paper, a separation claw 47 is operated to separate the paper from image-transfer drum 41. The printed paper passes through fixation device 48 and is delivered to paper-discharge tray 49.

Now, when reproducing full-color printed copies by repeatedly executing a reading and printing of the image, as mentioned earlier, deviation of each printed color position, in other words, deviation of the image at the top edge between the first scanning operation and the second scanning operation, is a big problem. To solve this problem, the digital color printer related to the present invention comprises position sensors 53-1 and 53-2 for detecting the circumferential position of image-transfer drum 51 and controls start of the scanning operation and printing. Based on the detected circumferential position of the drum 51, the control circuit, for controlling the timing for activating the scanning operation of scanner 10 and also the timing for activating the printing operation. Position sensors 53-1 and 53-2 are resepctively installed facing the circumference of imagetransfer drum 51, and detect a marker (not shown) set to a specific position in the circumferential direction of the image-transfer drum 51. Position sensors 53-1 and 53-2 are set to specific positions in order that the image-reading starting time constantly precedes the image-printing starting time even if, for any reason, the timing may deviate. Alternatively, a signal from the sensor 53-2 may be obtained through a delay timer from the sensor 53-1.

Figure 5:
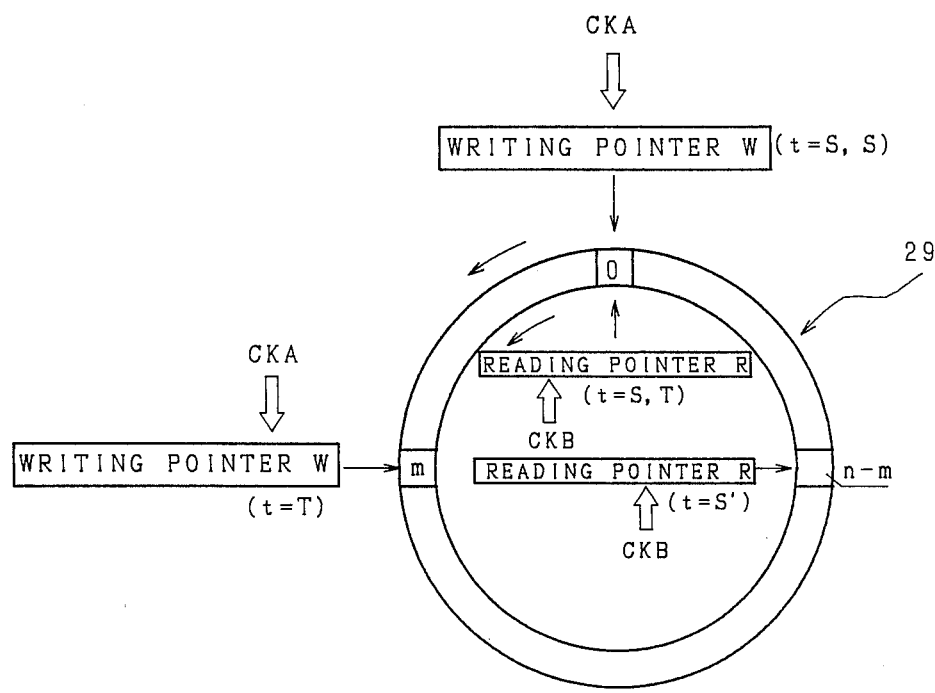
FIG. 5 is a schematic diagram of buffer memory related to the invention.

Furthermore, the digital color printer related to the invention securely prevents the position of the printable colors from deviating from themselves even if scanner 10 and imagetransfer drum 51 are incorrectly synchronize with each other by installing buffer memory 29 having substantial storage capacity between the print head 31 and itself. The digital color printer has ring-shaped buffer memory 29 as shown in FIG. 5. Data-writing pointer W of buffer memory 29 designates the address for writing data and data is written into said address in accordance with data-writing clock CKA. On the other hand, data-reading pointer R designates the address and data is read from the designated address in accordance with data-reading clock CKB and outputs the read-out data. Every time clocks CKA and CKB are inputted, addresses of writing pointer W and reading pointer R respectively advance themselves by one unit in the arrowed direction. When writing and reading data, the concept of line reading is not applied, but data is sequentially written into buffer memory 29 without distinguishing between data-reading lines. Therefore, addresses of buffer memory 29 can properly be controlled merely by data-writing clock CKA and data-reading clock CKB, a horizontal synchronizing signal is not needed. It is essential that clocks CKA and CKB are specifically arranged in order that the content of reading pointer R cannot catch up with the content of writing pointer W. By precisely arranging both pointers R and W in this way, the control circuit can deal with clocks CKA and CKB as asynchronous perfectly.

Next, the functional operation of buffer memory 29 is described below. By rotation of an image transfer drum 51, as shown in the timing chart of FIG. 6, responding to position sensor 53-1 which detects a marker and turns itself on, the scanning operation of scanner 10 is started. Simultaneously, CPU 26 generates reset signal to reset the contents of writing pointer W and reading pointer R of buffer memory 29. After a period of time which is determined by the characteristic of scanner 10 at the moment of starting the scanning operation, scanner 10 (denoted by the exposure lamp 12 in FIG. 6) arrives at the top edge of the original. At this timing S, read-out signal processor 20 starts to write image (print output) signal into buffer memory 20 beginning at address 0.

Then, scanner 10 moves itself at an even speed to read the original document and continues writing into the address corresponding to the content of writing pointer W renewed by clock CKA one by one.

On the other hand, when position sensor 53-2 detects a marker (t=T), print head 31 starts to read data from buffer memory 29 beginning at address 0. By this time, scanner 10 is already at the middle portion of original document 1 and reads this portion, which is written into address m in accordance with the content of writing pointer W.

Furthermore, while data is written into buffer memory 29, reading pointer R is incremented by clock CKB, then, those data already written into buffer memory 29 are transmitted to print head 31 and the printing operation is eventually executed. When the content of writing pointer W fully fills up address n (t=S'), then the content of the writing pointer W is initialized. After this initialization, writing pointer W varies itself into 0, 1, 2, ... n, and, on the other hand, reading pointer R varies itself into n−m, m−m+1, n−m+2, .... Data writing and reading operations are continuously followed up in the manner described above.

When the first round of the scanning operation and the first-color printing operation are completed by executing the image-reading scanning and subsequent operations, scanner 10 returns itself to the initial position. And when position sensor 53-1 detects the marker on image-transfer drum 51, then the second round of the image scanning operation, that is, the printing of the second color is executed by following up sequential operations identical to those which are described above.

As shown in FIG. 5, data writing and reading operations are cyclically executed relative to the synchronizing buffer memory 29 by arranging the operation of the writing pointer W to constantly precede the operation of the reading pointer R. To make this possible, positions of the position sensors 53-1 and 53-2 are preliminarily determined. The time interval between S and T may vary itself while executing each scanning operation provided that it should be constrained to be in the one-round data reading time S through S' set for the synchronizing buffer memory 29.

As is clear from the above description, in the invention, scanner 10 only has to rise itself to moderate synchronization with the rotation of image-transfer drum 51, and thus, scanner motor 11 can be controlled by means of inexpensive software. Buffer memory 29 determines the storage capacity dependent on the dimension of a region between S through S', which is slightly larger than the region S through T. That is, although the essential memory capacity of synchronizing buffer memory 29 varies in accordance with variation of the region between S through T, even though a maximum of 10 mm of error potential is allowable, compared to the provision of a full memory for the A-3 size original document, a maximum of 1/40th the storage capacity corresponding to A-3 size is enough for buffer memory 29.

Conventionally, a first-in and first-out (FIFO) memory consisting of a ring-shaped memory, writing address generator, and reading address generator, is made available. To constitute a preferred embodiment of the invention, the FIFO memory may also be used for buffer memory 29. This facilitates provision of an inexpensive interface without necessarily providing counter means for setting up the addresses.

According to the present invention, even if the top edge of the print output image signal from image reading means were not strictly synchronous with the top edge of the image on the printing paper to be determined by paper-feeding means of printing means, deviated synchronization, i.e., deviation of printable image, can easily and fully be absorbed by the simplified control circuit.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An electrophotographic digital color printer comprising;

an image reading portion which reads a color original document, executes color resolution and outputs dot image data of each color, wherein including;

an image sensor which reads an image of a color original document;

a scanning means for driving said image sensor to scan an image of an original document corresponding with each color; and a data processing means for processing dot image data read during the movement of said image sensor for scanning the image of a color original document and for outputting processed dot image data;

a printing portion which, based on said dot image read data by said image reading portion, electrophotographically generates a toner image for each color and transfers each said color toner image onto the identical printing paper, wherein including;

a photosensitive element;

means for generating an electrostatic latent image on said photosensitive element in response to supplied data;

plural developing devices which are selectively operated and contain different color toner respectively; and a paper-conveying means for circulating the identical printing paper to the image transferring position at which a toner image is received from said photosensitive element;

a buffer memory wherein data output from said data processing means is written, and said data is read out in the written order, and supplied to an electrostatic latent image generating means, said memory allowing the data to be written therein and read therefrom independently;

a first instruction means for instructing said scanning means to activate movement for a color in order that an image of the color original document is read by said image sensor and the data of said image is written into said buffer memory via said data processing means; and a second instruction means for instructing to start the reading of data for a color written into said buffer memory after said first instruction means generates said instruction to said scanning means and also after starting the writing of data into said buffer memory, wherein the start of the data reading in response to said second instruction means is executed synchronous with the paper-conveying operation by said paper-conveying means while printing of each color is underway.

2. An electrophotographic digital color printer as set forth in claim 1, wherein said data processing means has first clock pulse generating means and writes data into said buffer memory in accordance with first clock pulse.

3. An electrophotographic digital color printer as set forth in claim 2, wherein said first clock pulse generating means starts operation in synchronism with start of data writing.

4. An electrophotographic digital color printer as set forth in claim 1, wherein said electrostatic latent image generating means has second clock pulse generating means and reads data from said buffer memory in accordance with second clock pulse.

5. An electrophotographic digital color printer as set forth in claim 4, wherein said second clock pulse generating means starts operation in response to an instruction generated by said second instruction means.

6. An electrophotographic digital color printer as set forth in claim 1, wherein said paper-conveying means substantially consists of a drum which rotates itself with a printing paper being wound onto its circumferential surface.

7. An electrophotographic digital color printer as set forth in claim 6, wherein said first and second instruction means respectively have a sensor which detects arrival of said rotating drum at the predetermined position.

8. An electrophotographic digital color printer as set forth in claim 1, wherein said buffer memory is of ring-shaped constitution.

* * * * *